United States Patent
Barton et al.

(10) Patent No.: US 12,428,326 B2
(45) Date of Patent: Sep. 30, 2025

(54) INLINE END ENGAGING SYSTEM

(71) Applicant: King Technology Inc., Minnetonka, MN (US)

(72) Inventors: Eric Barton, Eden Prairie, MN (US); Jeffrey D Johnson, Edina, MN (US); Darrin M Swagel, Minnetonka, MN (US)

(73) Assignee: King Technology, Inc., Minnetonka, MN (US)

( * ) Notice: Subject to any disclaimer, the term of this patent is extended or adjusted under 35 U.S.C. 154(b) by 414 days.

(21) Appl. No.: 17/941,524

(22) Filed: Sep. 9, 2022

(65) Prior Publication Data

US 2023/0083720 A1    Mar. 16, 2023

Related U.S. Application Data

(60) Provisional application No. 63/360,214, filed on Sep. 14, 2021.

(51) Int. Cl.
*C02F 1/68* (2023.01)
*C02F 103/42* (2006.01)

(52) U.S. Cl.
CPC .......... *C02F 1/685* (2013.01); *C02F 2103/42* (2013.01); *C02F 2201/006* (2013.01)

(58) Field of Classification Search
CPC ...................................... C02F 1/685
USPC ........................................ 221/66
See application file for complete search history.

(56) References Cited

U.S. PATENT DOCUMENTS

| | | | |
|---|---|---|---|
| 5,402,872 A * | 4/1995 | Clurman | G07F 7/0609 221/66 |
| 7,052,615 B2 | 5/2006 | King et al. | |
| 7,060,190 B2 | 6/2006 | King et al. | |
| 8,113,382 B1 * | 2/2012 | Piersant | G07F 7/0609 221/102 |
| 10,612,258 B2 | 4/2020 | Coelho et al. | |
| 10,702,812 B2 | 7/2020 | Roesgen et al. | |
| 11,008,770 B1 | 5/2021 | Brennan | |
| 2004/0108261 A1 | 6/2004 | King et al. | |
| 2006/0113235 A1 | 6/2006 | Strohm et al. | |
| 2011/0198365 A1 * | 8/2011 | Rosenberg | A63F 13/95 221/66 |
| 2014/0353234 A1 | 12/2014 | Roesgen et al. | |
| 2016/0017621 A1 | 1/2016 | King et al. | |
| 2020/0122064 A1 | 4/2020 | Sderstrm et al. | |
| 2021/0260511 A1 | 8/2021 | Bonilla | |

OTHER PUBLICATIONS

International Patent Application No. PCT/US2022/043056, International Search Report and Written Opinion mailed Dec. 19, 2022, 9 pages.
European Patent Office, "Extended European Search Report", From Application No. 22870538.0, Dated Apr. 17, 2025, pp. 7.

* cited by examiner

*Primary Examiner* — Gene O Crawford
*Assistant Examiner* — Ayodeji T Ojofeitimi
(74) *Attorney, Agent, or Firm* — Fredrikson & Byron, P.A.

(57) ABSTRACT

A cartridge carrier having a skeleton housing with a cartridge cradle for supporting a cartridge dispenser therein and a connector on the skeleton housing for supporting a further dispensing cartridge outside of the skeleton housing.

18 Claims, 5 Drawing Sheets

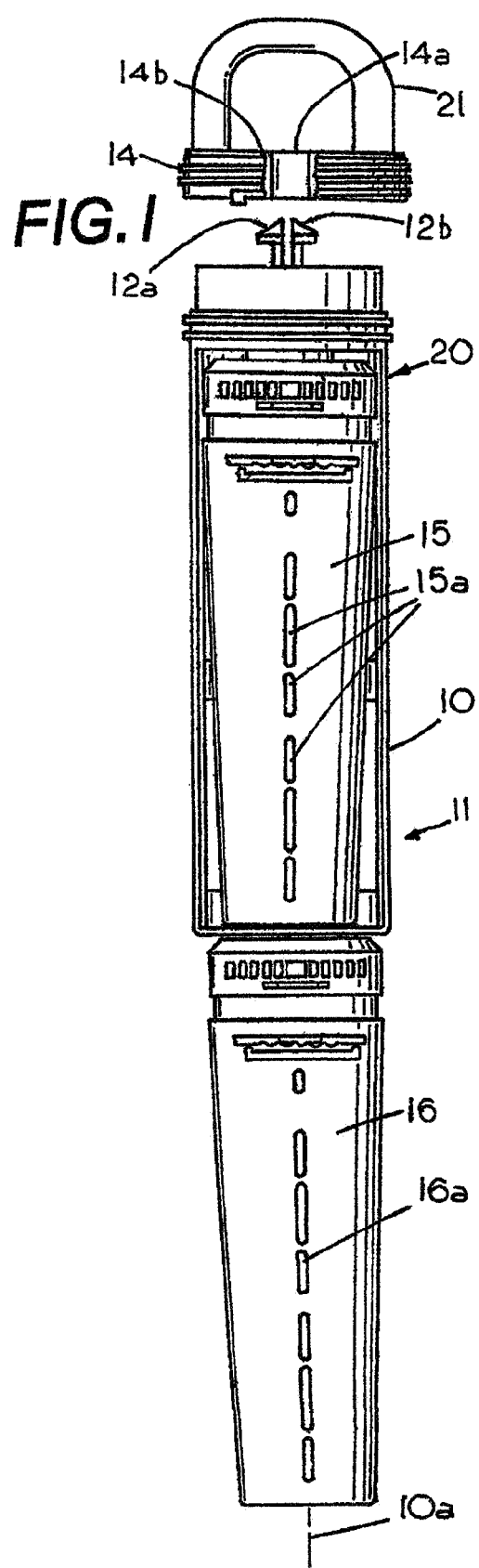
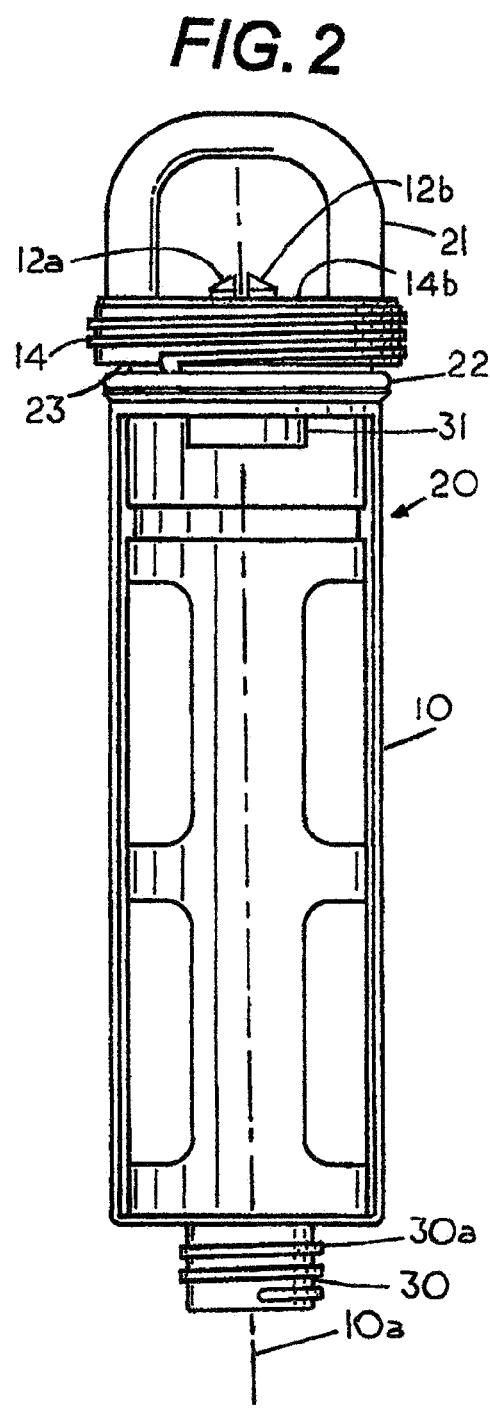

US 12,428,326 B2

INLINE END ENGAGING SYSTEM

CROSS REFERENCE TO RELATED APPLICATIONS

This application claims priority from provisional application 63/360,214 filed Sep. 14, 2021.

STATEMENT REGARDING FEDERALLY SPONSORED RESEARCH OR DEVELOPMENT

None

REFERENCE TO A MICROFICHE APPENDIX

None

BACKGROUND OF THE INVENTION

Summary of the Invention

An inline end engaging system where a dispensing cartridge is cradled within a skeleton housing of a cartridge carrier and a second dispensing cartridge is connected to an end of the skeleton housing to form an inline end engaging system where one of the cartridge dispensers is in a dispensing condition within the skeleton housing and a second cartridge dispenser is in a dispensing condition outside of the skeleton housing.

BRIEF DESCRIPTION OF THE DRAWINGS

FIG. 1 shows a cartridge carrier skeleton housing with a cartridge dispenser cradled within the skeleton housing and a further cartridge dispenser in engagement with the outside end of the skeleton housing;

FIG. 2 shows a cartridge carrier skeleton housing without a cartridge dispenser cradled within the skeleton housing and without a dispensing cartridge in engagement with the outside end of the skeleton housing;

DESCRIPTION OF THE PREFERRED EMBODIMENT

Figure 3:
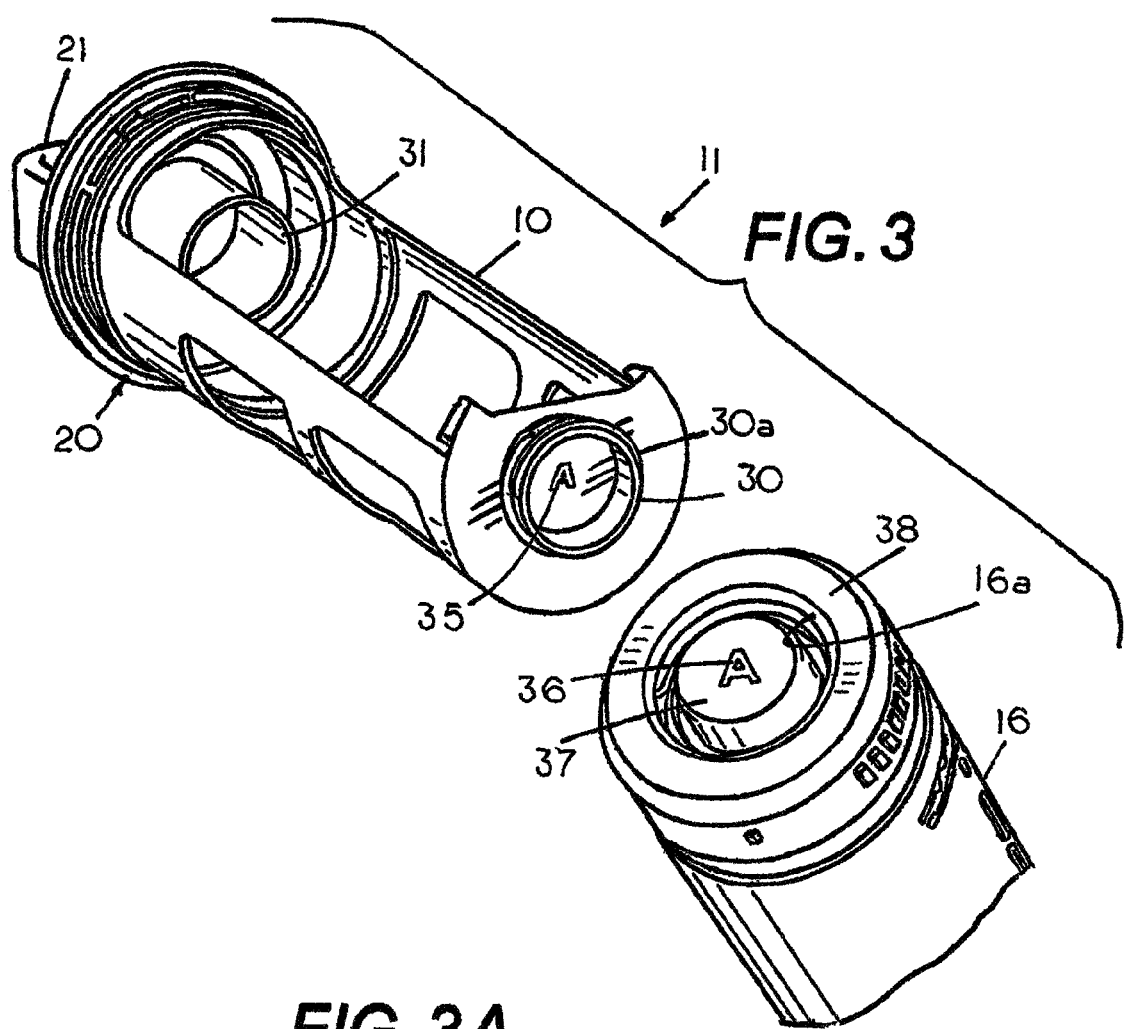
FIG. 3 shows a cartridge carrier skeleton housing with an end connector and a cartridge dispenser with a mating end connector.

FIG. 1 shows a cartridge carrier 20 comprising an inline end engaging system that includes a skeleton housing 10 cradling an inline cartridge dispenser 15 while also engaging and supporting the end of a second inline cartridge dispenser 16, which is located outside of skeleton housing 10 but in axial alignment with cartridge dispenser 15. Typically, the inline end engaging system 20 is employed in a well such as found in a hot tub or the like. A threaded hub 14 having a central opening 14a and a handle 21 that enables one to place the cartridge carrier 20 with the cartridge dispensers contained therein as a unit into a dispensing chamber. A set of resilient hooks 12a and 12b extended vertically upward for insertion through an opening 14a in hub 14 with sufficient clearance that when hub 14 is in engagement with hooks 12a and 12b (see FIG. 2) the handle and hub 14 are rotatable with respect to hub surface 14b on hub 14 housing 10.

Typically, replaceable cartridge dispensers are used to maintain recreational water such as pool water or hot tub water in a user-friendly condition. In this example cartridge dispenser 15 includes a set of water ports 15a for ingress and egress of water therethrough and cartridge dispenser 16 includes a further set of water ports 16a for ingress and egress of water therethrough. Thus, cartridge dispenser 15, which is located inside of skeleton housing 10 and the cartridge dispenser 16, which is located outside of the skeleton housing are both held in a dispensing condition by cartridge carrier 10 along a central axis 10a.

FIG. 2 is an isolated view of the cartridge carrier 20 with the hooks 12a and 12b forming rotational engagement with hub 14 and without dispensing cartridges therein. Located within skeleton housing 10, which comprises a cartridge cradle, is an internal annular male locator or connector 31 for inline engaging a female connector in a top end of a cartridge dispenser, which can then be cradleable held in skeleton housing 10. As shown male connector 31 is a locater and as well as a connector that fits within an annular recess or keyway in a cartridge dispenser for correctly positioning the cartridge dispenser within the skeleton housing 10. In addition, connector 31 prevents insertion of a cartridge dispenser without a mating keyway into the skeleton housing.

FIG. 2 and FIG. 3 show the outside end of skeleton housing 10 contains an annular male connector 30, which functions as an annular key as well as a locator for interfitting a cartridge dispenser in skeleton housing 10. Connector 30 contains a set of male threads 30a, for engaging a top end of a second dispensing cartridge 16 that contains mating female threads therein. In this example, the cartridge carrier 10 contains an internal connector comprising an annular key 31 and an external annular connector 30 that each require a mateable cartridges with a keyway therein.

In the example of FIG. 1 only one cartridge (i.e., cartridge 15) is held in skeleton housing 10, however, two or more cartridges could be held in a longer skeleton housing with a third attached to an end of the skeleton housing 10. As shown in FIG. 1 the bottom end of dispensing cartridges 15 and 16 are flat and lack any geometrical shaped features or connectors thereon.

An advantage of inline system 11 is that connector 30 and connector 31 also function as keys to prevent someone from inserting a cartridge dispenser that may not contain suitable contents. A further advantage of the cartridge carrier of FIG. 1 is that that the water ports 16a of the external cartridge dispenser 16 are fully exposed to water flowing past or proximate cartridge dispenser 16 since they are outside the skeleton housing 10.

Figure 3A:
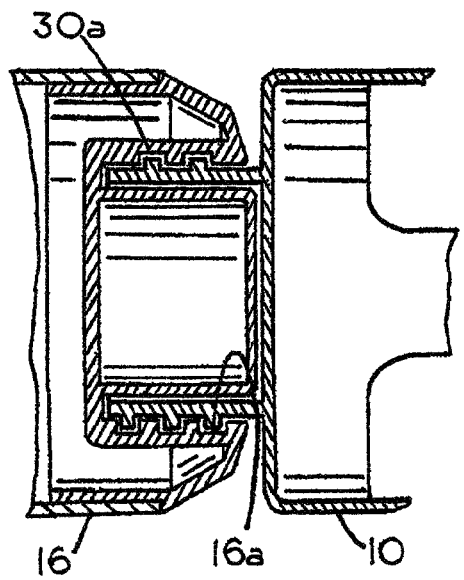
FIG. 3A is a sectional view showing the male threads on the end of a skeleton housing in engagement with female threads in the top of cartridge dispenser.

FIG. 3 shows skeleton housing 10 in an empty condition with a top end of a cartridge dispenser 16 located proximate a bottom end of cartridge carrier 10 to reveal a connector 38 on the cartridge dispenser 16 and a connector 30 on the cartridge carrier 10. In this example connector 30 and connector 38 can be brought into threaded engagement with each other as shown in FIG. 3A. That is, connector 30 on the exterior end of housing 10 comprises a male connector 30 with threads 30a and the connector 38 on the top of cartridge 16 comprises a female connector that includes female threads 16a. In this example, one rotates cartridge 16 with respect to cartridge carrier 10 to bring the connector 30 and connector 38 into threaded engagement with each other to cantileverly support dispensing cartridge 16 at the end of cartridge carrier 10.

Also, in this example the end of cartridge carrier 10 contains a visual mark "A" and the top of cartridge 16 contains a cylindrical protrusion 37 that also includes a visual mark "A", which in this case identifies that cartridge 16 and cartridge carrier 10 are mateable with each other. The use of a common visual indicator, such as a symbol or letter is a quick and convenient way to alert a user that the cartridge and cartridge carrier are mateable with each other and thus avoid trial-and-error testing.

FIG. 3A is a sectional view showing male threads 30a, which are on the end of the skeleton housing 10, in engagement with the female threads 16a located in a top end of cartridge dispenser 16. FIG. 1 shows that the threaded engagement between the housing 10 and cartridge dispenser 16 supports cartridge dispenser 16 in axial alignment with a cartridge dispenser 15.

Figure 4:
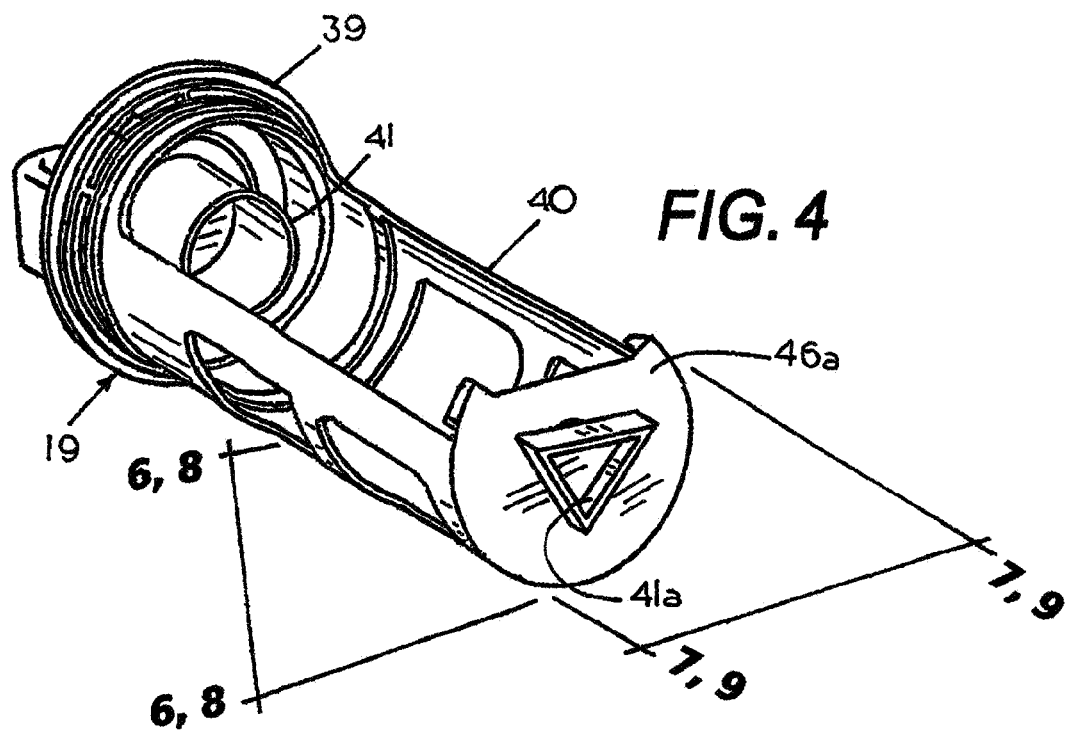
FIG. 4 shows an example of a geometric shape connector comprising a triangular shape male connector located on an end of a cartridge carrier.
Figure 4A:
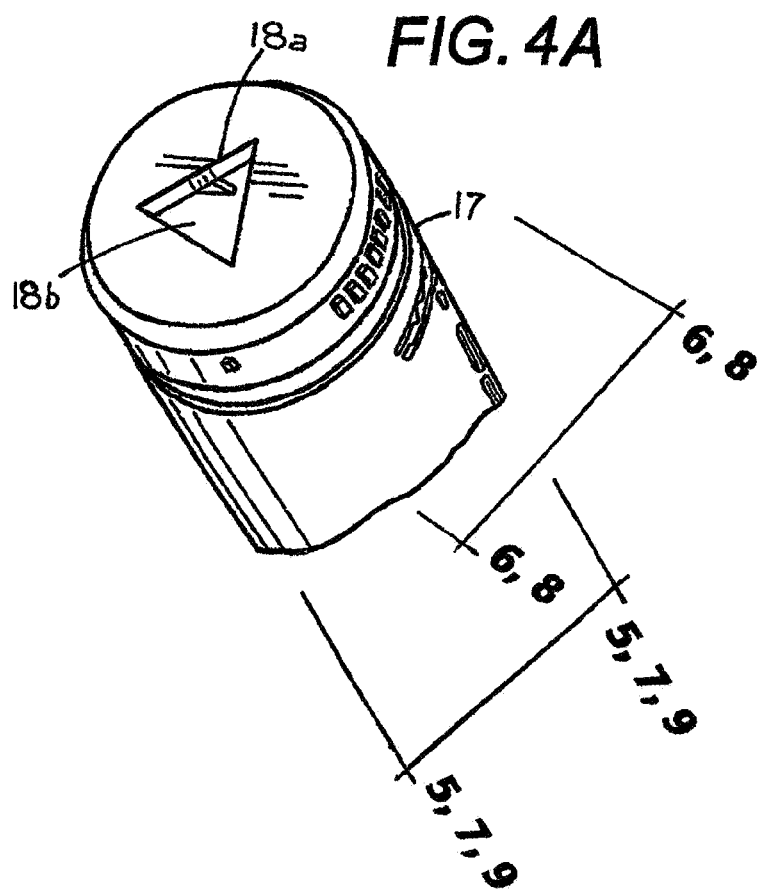
FIG. 4A shows an example of a geometric shape connector comprising a triangular shape female connector located on an end of a cartridge dispenser.

FIG. 4 shows a cartridge carrier 19 having a triangular shaped male connector 41a, which in this case is a bayonet connector 41a, that fits within a triangular shaped end connector 18a on cartridge dispenser 17, which is shown in FIG. 4A. In this example, the triangular shaped male connector 41a is inserted into the triangular shaped opening 18b in female connector 18a. Once inserted the housing 40 and cartridge dispenser 17 are twisted with respect to each other to lock the cartridge dispenser 17 to the end of skeleton housing 40.

As shown in the drawings the connectors (30, 31, 41 and 41A) on the skeleton housing 10 and the connectors (38 and 18a) on the cartridge dispensers perform a dual function as they are also mechanical locators to assist in assemble of cartridge dispensers into an inline end engaging system where the cartridge dispensers are located in axial alignment with each other but at least one cartridge dispenser is outside of the skeleton housing.

One of the features of the in-line end engaging system shown in FIG. 1 is that the connectors on the skeleton housing and the connectors on the dispensing cartridges may be color coded to indicate the mechanical compatibility of the cartridge dispensers with either the interior or the exterior of the skeleton housing.

A further feature is that the connectors or features proximate the connectors on the skeleton housing can be color coded to indicate a chemical compatibility with cartridge dispensers and the skeleton housing that together form an inline in-line end engaging system.

Other features of the in-line end engaging system where the connector and features proximate the connector is coded with either a letter, symbol, or combination to match similar markings on the engaging features proximate thereto. For example, the use of the letter A on housing 10 and the letter A on cartridge dispenser 16 as shown in FIG. 3.

FIG. 5 to FIG. 9 illustrate the steps in connecting an end connector 41a on cartridge carrier 39 to a cartridge dispenser 17 having a mating connector though an insertion of one connector into the other connector the followed by twisting of the connectors with respect to each other. In this example the male end connector 41a has a geometric shape such as a triangle and the female connector 18a in the end of cartridge dispenser 17 also has a geometric shape opening such as a triangle.

Figure 5:
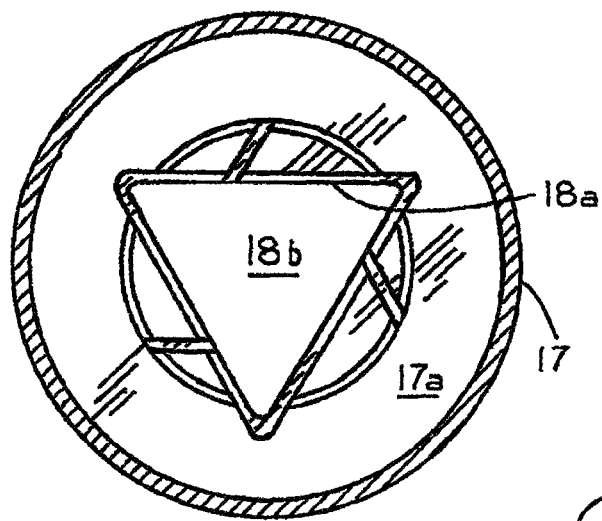
FIG. 5 is a sectional view of the end of a cartridge dispenser taken along lines 6-6 of FIG. 4A.
Figure 6:
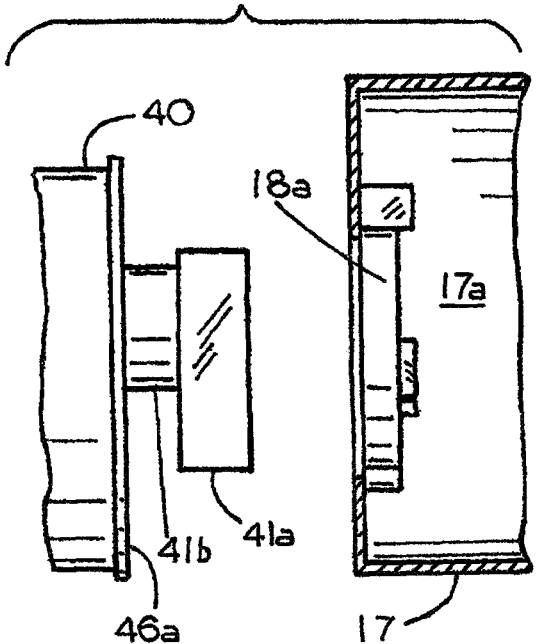
FIG. 6 is an exploded view of the end of skeleton housing FIG. 4 and a sectional view of the cartridge dispenser of FIG. 4A located in alignment for forming interfitting engagement with each other.
Figure 7:
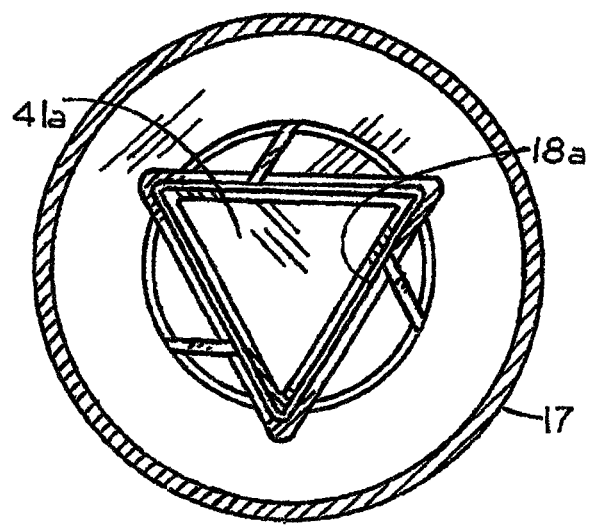
FIG. 7 is a sectional end view of the triangular shape male connector of FIG. 4 in alignment with the triangular shaped opening in the cartridge dispenser of FIG. 4A.
Figure 8:
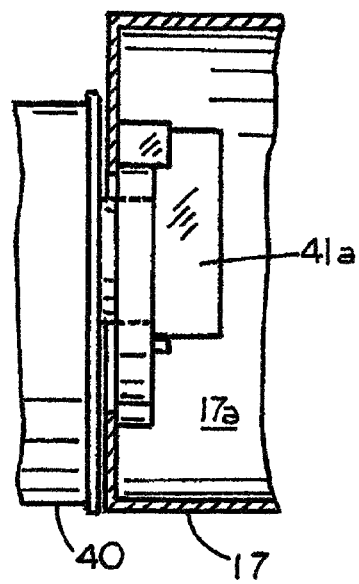
FIG. 8 is side view of triangular shape male connector of FIG. 4 located in the cartridge dispenser of FIG. 4.

FIG. 5 is a sectional view taken along lines 6-6 of FIG. 4A revealing cartridge dispenser 17 and the interior chamber 17a of cartridge dispenser 17 for receiving a male connector 41a. That is, the triangular shape opening 18b and interior compartment 17a permit one to insert the triangular shape connector 41a completely into interior compartment 17a through opening 18b. FIG. 6 is a side view of the end of skeleton housing 40 and connector 41a, which attaches thereto with neck 41b, in position for insertion connecter 41a into chamber 17a. In the example shown the male connector 41a on skeleton housings 40 and the opening 18b in cartridge 17 are located in alignment for insertion of male connector 41a into chamber 17a. FIG. 7 is an end view showing the triangular shape male connector 41a located in opening 18a in the end of cartridge dispenser 17 and FIG. 8 is side view of the triangular shape male connector 41a of FIG. 4 located in the cartridge dispenser chamber 17a.

Figure 9:
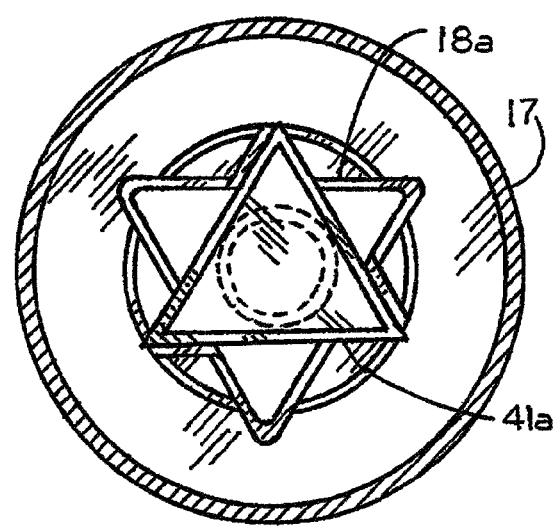
FIG. 9 is an end view of a triangular shape male connector of FIG. 4 rotated into engagement with the triangular shaped female connector in the cartridge dispenser of FIG. 4.

FIG. 9 is an end view of the triangular shape male connector 41a on cartridge carrier 39 with the cartridge carrier 39 and cartridge 17 rotated into an engagement position that secures cartridge 17 to the end of cartridge housing 40. In this example a cartridge within cartridge carrier 39 and a cartridge 17 on the end of the cartridge carrier are in axial alignment with each other to enable easy and quick insertion or removal of the cartridge carrier and the cartridge dispensers from a well where the dispersants are delivered to a body of recreational water.

Although a triangular shaped male connector and a triangular shaped female connector are shown in engagement, other types of geometric shape connectors as well as bayonet connectors may be used without departing from the spirit and scope of the invention.

For example, ball-detent connectors can be used for temporarily securing a dispensing cartridge to the end of a skeleton housing. With ball-detent connectors on the end of the cartridge carrier and on a cartridge dispenser one axially aligns and inserts the male ball-detent connector into female ball detent connector to support cartridge 16 on the end of the skeleton housing 10.

Other types of connectors to obtain engagement between skeleton housing 10 and a cartridge dispenser may include having a latch on the skeleton housing that engages a mating latch on cartridge dispenser. Once engaged a lever can be used to disengage dispenser cartridge from the skeleton housing.

We claim:

1. An inline cartridge carrier comprising:
    a skeleton housing having a top end and a bottom end with a cartridge cradle therebetween, the cartridge cradle sufficiently large to hold at least one cartridge dispenser therein;
    a cartridge connector in the cartridge cradle, the cartridge connector comprising a key for engaging a mating keyway in a cartridge dispenser while preventing engagement of a cartridge dispenser without a mating keyway; and a further connector located on the bottom end of the skeleton housing for engaging an end of a further cartridge dispenser to support the further cartridge dispenser outside of the cartridge cradle, wherein the further connector comprises a further key, the further key comprising a geometrical shape cantileverly extending from the bottom end of the skeleton housing.

2. The inline cartridge carrier of claim 1 wherein the cartridge connector comprises a bayonet connector.

3. The inline cartridge carrier of claim 1 wherein the cartridge connector comprises a first set of mateable threads of a first diameter and the further cartridge connector comprises a second set of mateable threads of a second diameter.

4. The inline cartridge carrier of claim 1 comprising a first cartridge dispenser and a second cartridge dispenser, wherein the cartridge cradle supports the first cartridge dispenser and the further connector engages the second cartridge dispenser, the cartridge cradle and the further connector holding the first cartridge dispenser and the second cartridge dispenser in axial alignment.

5. The inline cartridge carrier of claim 1 wherein the cartridge connector in the cartridge cradle comprises an annular extension extendable into a keyway in a cartridge dispenser to prevent insertion of a cartridge dispenser without a keyway therein.

6. The inline cartridge carrier of claim 1 wherein the cartridge connector in the cartridge cradle is an annular extension and the further connector is a male connector.

7. The inline cartridge carrier of claim 1 wherein the geometrical shape is a four-pointed star.

8. The inline cartridge carrier of claim 1 including a handle on the top end of the skeleton housing for inserting or removing the inline cartridge carrier into or from a well in a hot tub.

9. The inline cartridge carrier of claim 1 wherein the cartridge connector comprises an annular member.

10. The inline cartridge carrier of claim 1 wherein the further connector located on the bottom end of the skeleton housing comprises a male thread.

11. The inline cartridge carrier of claim 1 wherein the geometrical shape comprises a triangular shape.

12. A cartridge carrier comprising:
a skeleton housing having a top end and a bottom end with a cartridge cradle therebetween, the cartridge cradle sufficiently large to hold at least one cartridge dispenser therein; and
a cartridge connector located on an end of the skeleton housing with the cartridge connector engageable with a further cartridge dispenser to support the further cartridge dispenser outside of the cartridge cradle,
wherein the cartridge connector has a geometric shape mateable to a geometric shape on the further cartridge dispenser.

13. The cartridge carrier of claim 12 including a key within the skeleton housing for preventing insertion of a cartridge dispenser without a mating keyway.

14. The cartridge carrier of claim 12 comprising a further cartridge dispenser, wherein the skeleton housing has a central axis and the cartridge connector supports the further cartridge dispenser along the central axis.

15. The cartridge carrier of claim 14 wherein the cartridge connector and the further cartridge dispenser are color coded.

16. The cartridge carrier of claim 12 including a handle on the top end of the skeleton housing for placement or removal of the cartridge carrier into or from a well, a cartridge dispenser located within the cartridge cradle, and a further cartridge dispenser secured to the bottom end of the skeleton housing.

17. The cartridge carrier of claim 12 wherein the cartridge connector comprises a male thread.

18. An inline cartridge carrier comprising:
a skeleton housing having a top end and a bottom end with a cartridge cradle therebetween, the cartridge cradle sufficiently large to hold at least one cartridge dispenser therein;
a cartridge connector in the cartridge cradle, the cartridge connector comprising a key for engaging a mating keyway in a cartridge dispenser while preventing engagement of a cartridge dispenser without a mating keyway; and
a further connector located on the bottom end of the skeleton housing for engaging an end of a further cartridge dispenser to support the further cartridge dispenser outside of the cartridge cradle,
wherein the further connector is an extension located along an axis of the inline cartridge carrier with the extension having a male thread thereon.

\* \* \* \* \*